United States Patent [19]
Nishino et al.

[11] 4,093,346
[45] * June 6, 1978

[54] OPTICAL LOW PASS FILTER

[75] Inventors: Hisashi Nishino; Teruo Hosokawa, both of Sakai; Ikuo Hioki, Kishiwada, all of Japan

[73] Assignee: Minolta Camera Kabushiki Kaisha, Azuchi, Japan

[*] Notice: The portion of the term of this patent subsequent to Oct. 30, 1990, has been disclaimed.

[21] Appl. No.: 581,004

[22] Filed: May 27, 1975

Related U.S. Application Data

[63] Continuation-in-part of Ser. No. 379,013, Jul. 13, 1973, Pat. No. 3,910,683, which is a continuation-in-part of Ser. No. 164,757, Jul. 21, 1971, Pat. No. 3,768,888.

[30] Foreign Application Priority Data

May 24, 1974 Japan .................................. 58649[U]

[51] Int. Cl.² .......................... G02B 5/18; G02B 27/38
[52] U.S. Cl. ............................. 350/162 SF; 350/314; 358/5; 358/44
[58] Field of Search ................. 350/162 SF, 314, 166; 358/5, 44–47

[56] References Cited
U.S. PATENT DOCUMENTS

| | | | |
|---|---|---|---|
| 2,733,291 | 1/1956 | Kell | 350/162 SF |
| 3,756,695 | 9/1973 | Mino et al. | 350/162 SF |
| 3,768,888 | 10/1973 | Nishino et al. | 350/162 SF |
| 3,910,683 | 10/1975 | Nishino et al. | 350/162 SF |

OTHER PUBLICATIONS

Townsend, Applied Optics, vol. 11, No. 11, Nov. 1972, pp. 2463–2472.

*Primary Examiner*—Ronald J. Stern
*Attorney, Agent, or Firm*—Wolder, Gross & Yavner

[57] ABSTRACT

An optical low-pass filter in the form of a rectangular wave phase grating including at least two sets of parallel phase retardation laminae, the laminae in each set being at an angle to the laminae of the other set. The optical filter is disposed in an optical system provided with a color-encoding filter, such as a single tube color television camera, and the high frequency components of an image on the color-encoding filter are attenuated below a predetermined level. The degree of blur, which is larger than the value calculated from the grating period of the color-encoding filter, is effected by a first set of laminae and beats appearing in the image defocused on the color-encoding filter due to the laminae is attenuated by another set or the other set of laminae.

20 Claims, 15 Drawing Figures

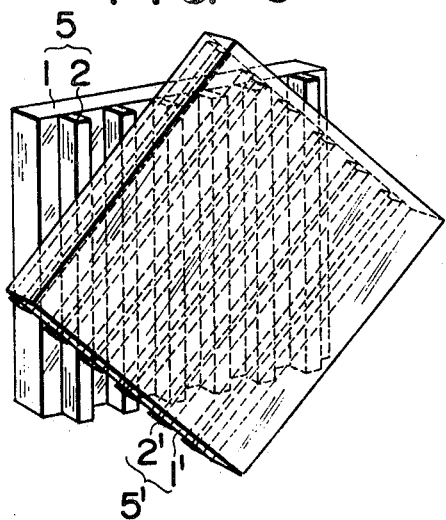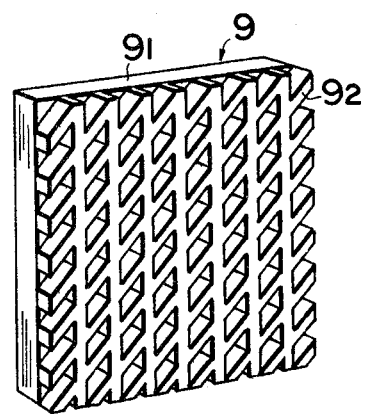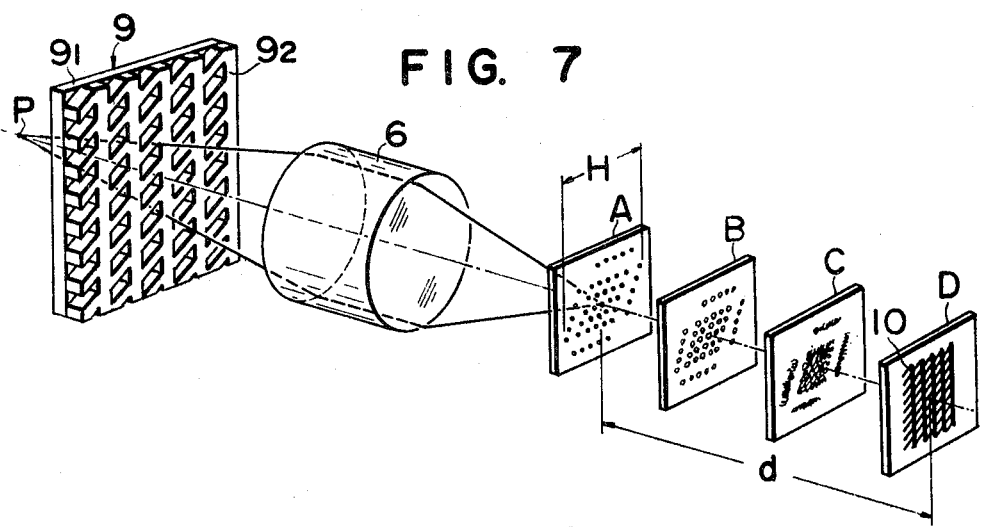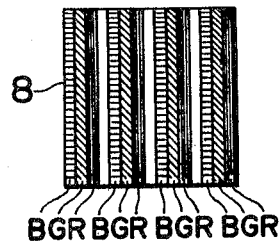

OPTICAL LOW PASS FILTER

REFERENCE TO RELATED PATENT APPLICATIONS

The present application is a continuation-in-part of patent application Ser. No. 379,013, filed July 13, 1973, now U.S. Pat. No. 3,910,683, which is a continuation-in-part of patent application Ser. No. 164,757, filed July 21, 1971, now U.S. Pat. No. 3,768,888.

BACKGROUND OF THE INVENTION

The present invention relates to an optical system having a color-encoding filter means, for example in a single tube color television camera, and an optical low-pass filter in an objective lens system for attenuating beats appearing on the television picture, and more particularly, it relates to and contemplates an optical system in which the optical low-pass filter is formed of a rectangular wave phase grating including a plurality of sets of laminae for introducing phase retardation, the laminae of each set being arranged in parallel with each other and the laminae of different sets being arranged at an angle with each other.

In the prior art, for example, in television cameras of a single image tube or two image tube type, it has been well known to use a color-encoding filter means disposed in the light path of an optical system so as to obtain three primary color signals.

In such an optical system in a television camera, it has been also well known that a beat occurs on the picture image in the color television which is due to the fact that a circuit for detecting color signals in a color television system misdetects high frequency components with regard to or along the scanning direction of the image tube in a picture image on the color-encoding filter as chrominance signals.

In order to attenuate such a beat, it is required that high frequency components of the objective image on the color-encoding filter are attenuated below a predetermined level. In order to satisfy this demand, in the optical system there is provided an optical low-pass filter to effect a degree of blur larger than the value calculated from the grating period of the color-encoding filter to the objective image on the color-encoding filter, regardless of the f-number and the diaphragm aperture value of the objective lens system.

As such an optical low-pass filter, it has been known that a polyhedron prism, nylon mesh, or the like has been used, however, each of these is highly difficult to manufacture and also to incorporate into the photographic lens and is, accordingly, not suitable for practical use.

A unique low-pass filter composed of an asymmetrical rectangular wave phase grating, in which on a transparent base plate laminae of equal widths for giving a phase retardation are regularly disposed with identical pitches in an identical direction, has been disclosed in the U.S. patent Ser. No. 379,013 filed July 13, 1973, now U.S. Pat. No. 3,756,695, and having the same assignee as the present application. Said optical low-pass filter has the advantage of being simple to manufacture because it can be obtained through the conventional vacuum evaporation method and it is easy to incorporate it into the objective lens. While it has the drawbacks in that when a degree of blur in the image of the principal object to be focused on the color-encoding filter is beyond a predetermined level, the beats due to other kinds of high frequency components undesirably appear by inserting said low-pass filter.

The present invention aims to remove the above drawbacks and provide an optical low-pass filter in which all object images which are focused or not focused on the color-encoding filter cause no beats.

OBJECTS OF THE INVENTION

One object of the present invention is to provide an optical low-pass filter means which is applied to an optical system having an objective lens and a color-encoding filter means, and that prevents the occurrence of beats effected in picture images.

Another object of the present invention is to provide an optical low-pass filter means which is employed in an optical system having an objective lens and a color-encoding filter, and that forms no beats in the object images of said objective lens which are focused or not focused on said color filter plane.

Further, another object of the present invention is to provide an optical low-pass filter which attains the above-mentioned objects and is easy to manufacture and insert into an optical system.

The other objects of the present invention will be apparent from the following detailed description.

SUMMARY OF THE INVENTION

In order to attain the above-mentioned objects, the present invention contemplates the provision of an optical system having a color-encoding filter means for use, for example, in a single tube color television camera and an optical low-pass filter is an objective lens system for attenuating beats which appear on the television picture, wherein the optical low-pass filter is a rectangular wave phase grating including a plurality of sets of laminae for introducing phase retardation, the laminae in each set being arranged in parallel with each other and the laminae of different sets being arranged at an angle to each other. The high frequency components of an objective image focused on the color-encoding filter means are attenuated below a predetermined level by means so arranged that there is imparted to the image focused on the color-encoding filter means a degree of blur always larger than the value calculated from the grating period of the color-encoding filter means, and other high frequency components effected in an object image defocused on the color-encoding filter means are prevented.

Through a rectangular wave phase grating having one set of laminae for introducing phase retardation an image of a point focused on a predetermined position by the objective lens system effects a Fraunhofer order diffraction image at a position distant from the focusing point, having the spread in the direction of that of the laminae, namely, in the direction at right angles to the direction along the laminae instead of a single point image. Depending upon the width of spread of said diffraction image, gradation of said focus image evolves.

However, in the case of a defocused image, which is observed at a position which is a predetermined distance from the focused position, interference striped patterns occur, and when the striped interference patterns are formed on the color-encoding filter, the period of the striped patterns being approximately to the period of the color-encoding filter wrong color signals are produced, and as a result, in an apparatus making use of such an optical system, for example, in a single tube color television camera system, beats occur on the television picture.

However, in the present invention another set of laminae are arranged in parallel with each other for introducing phase retardation, and the laminae of the set being arranged at an angle to that of the first set can attenuate striped interference patterns and wrong color signals due to high frequency components in the striped patterns.

BRIEF DESCRIPTION OF THE DRAWINGS

FIG. 5 is a perspective view of one embodiment of the optical low-pass filter in accordance with the present invention, in which two sets of rectangular phase gratings are disposed so that both sets of laminae are at an angle to each other.

FIG. 6 is a perspective view of another embodiment in accordance with the present invention having a phase plate including two sets of rectangular phase gratings in which laminae in each set are parallel with each other and the laminae of different sets are at an angle to each other on a single base plate.

FIG. 7 is a perspective view showing diagrammatically diffraction images on the focal plane and the defocus plane in the case where the optical low-pass filter in said embodiment is positioned in the objective lens.

FIG. 8 is a front view showing one example of a color-encoding filter.

DESCRIPTION OF THE PREFERRED EMBODIMENT

Figure 1:
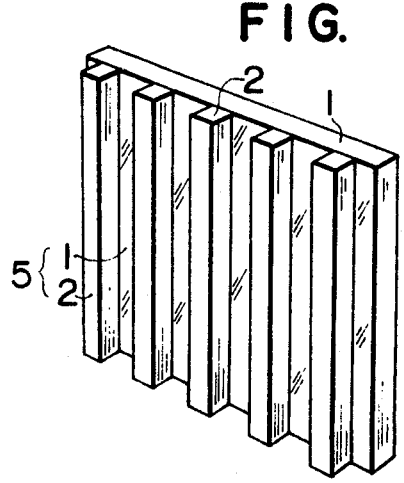
FIG. 1 is a perspective view of a phase plate including a rectangular wave phase grating having a set of laminae.
Figure 2:
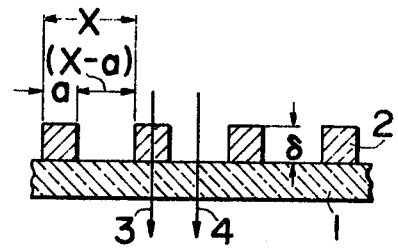
FIG. 2 is a section view along the arranged direction of the laminae.

FIG. 1 and FIG. 2 show an optical low-pass filter composed of a rectangular phase grating 5, which constitutes a part of an embodiment in accordance with the present invention and has its phase disposition in a single direction, wherein on a transparent clear base plate 1, transparent clear laminae 2 are arranged in parallel with each other and in which the grating pitch of the laminae 2 is X and the width of said laminae 2 is a and the space between adjacent laminae 2 is X - a. Also, the phase retardation effected of said laminae 2 is $\delta$. Between light ray 3 through lamina 2 and light ray 4 only and through base plate 1, the phase difference $\delta$ results.

As described in U.S. Pat. No. 3,756,695, the laminae 2 are advantageously of the same size and dimensioned to provide a phase $\delta$ selected from the range given by the following formulae:

$$1 - 0.35\,(q+1) \geq \cos \delta \geq 1 - 0.65\,(q+1)$$

wherein $q$ is the ratio equal to the total sum of areas not covered by said optical elements or laminae divided by the total sum of the areas covered by the optical elements or laminae, said ratio being not less than 1. While the period or interval between laminae is advantageously constant, it may vary slightly but, in any event, it should satisfy the formulae herein set forth with the respective mean dimensions being employed. Moreover, the laminae may be of trapezoidal transverse cross section as well as of rectangular transverse cross section. The laminae of trapezoidal transverse cross section may be of the dimensions and configuration described in the article entitled "Optical Low-Pass Filter for a Single Vidicon Color Television Camera" appearing in the Journal of the SMPTE, April 1972 issue, volumn 81 and particularly FIG. 6 thereof on page 283. Moreover, as described in the above-identified application, the following optical element conditions are advantageously met:

$$1 - 0.35\,X/A \geq \cos \delta \geq 1 - 0.65\,X/A$$

in which A = a (when a $\geq$ X−a), A = X−a (when a $\geq$ X−a), X is the grating period of the stripe filter and a is the lamina width. Further, the filter transparent support may be a lens face.

Figure 3:
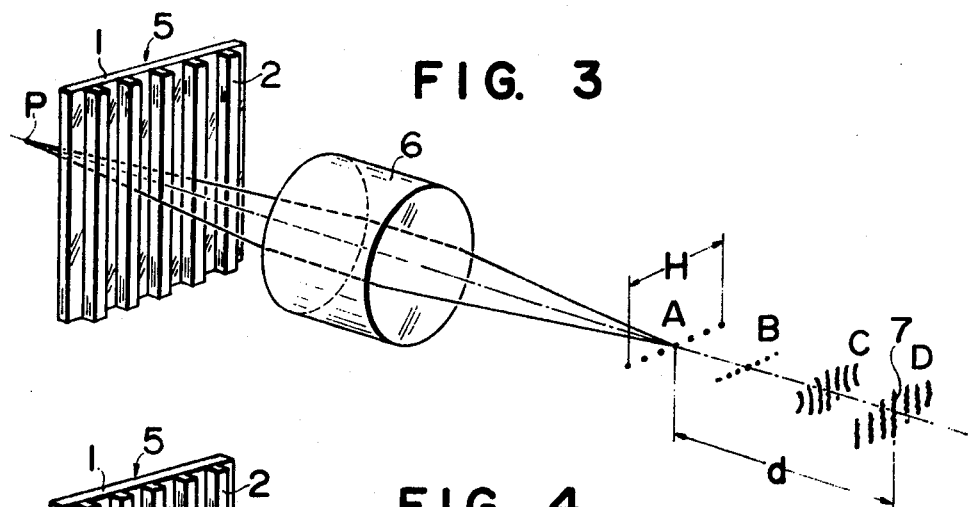
FIG. 3 is a perspective view showing diagrammatically various diffraction images formed at various points through a rectangular phase grating and an objective lens system.

FIG. 3 shows the states of various images formed at various points through a rectangular phase grating 5 and an objective lens system 6 and whereby the object point P on the optical axis of objective lens 6 forms various images. When the optical system 6 is not provided with optical low-pass filter 5, the object point P forms a point image on its conjugate point through objective lens system 6, however, when optical system 6 is provided with low-pass filter 5, the image of object point P as effected through objective lens system 6 and low-pass filter 5 passes through said conjugate point and brings about a diffraction image of the Fraunhofer order composed of a plurality of point images spread in a straight line in the direction along which the gratings of low-pass filter 5 are arranged onto plane A at right angles to the optical axis. Through pattern width H of this diffraction image a blur appears on the image. When said width H is broader than about twice a grating period of a color-encoding filter for forming in succession a striped pattern, for example, of blue, green, red and white, as shown in FIG. 8, interference between said image and the color-encoding filter can be prevented.

The situation described above is in the event that the image point is on the focal plane A of objective lens system 6 relative to object point P. However, when this is on the plane B or C spaced from the focal plane A, an interference striped pattern occurs, as shown in FIG. 3, and a very clear interference striped pattern 7 occurs in the striped pattern in the same direction as phase grating 2 and is the spread in the direction at right angles to said phase grating 2, on the plane D separated a specific length d from focal plane A, as shown in FIG. 7.

When the period of said diffraction striped pattern 7 is approximate the grating period of the color-encoding filter 8 in FIG. 8, interference occurs between them, and if such an optical system is used in a color television camera, a beat in a color pattern occurs in respect to an image focused distance from the specific focusing point. As to said phenomenon, as the result of experiment, in the case that objective lens 6 is moved forwardly a certain distance from the position where the focusing point of P is focused on plane A the interference appears on the image.

Thus, in accordance with the present invention, as shown in FIG. 5, two rectangular wave phase gratings 5 and 5' each having a base plate 1 or 1' and a set of laminae 2 or 2' arranged in parallel with each other on respective base plates 1 and 1' as shown in FIG. 1 and FIG. 2 and are superimposed on each other so that base plates 1 and 1' are parallel with each other and each laminae 2 and 2' on different base plates 1 and 1' are arranged to cross at an angle to each other to form one optical low-pass filter.

Figure 4:
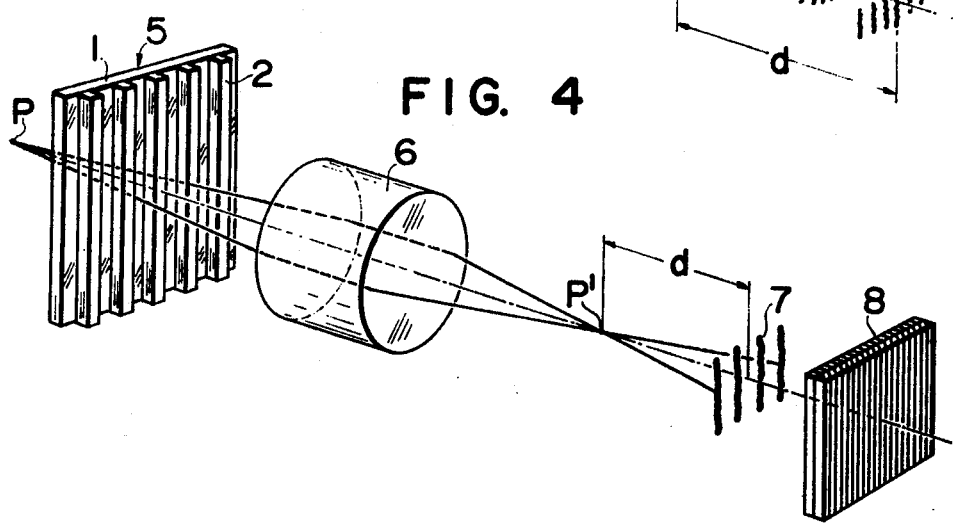
FIG. 4 is a perspective view showing diagrammatically the phase where the striped diffraction patterns of an image shown in FIG. 3 and the grating patterns of the color-encoding filter bring about interference therebetween.

In such a low-pass filter having two sets of laminae for introducing phase retardation, the interference striped pattern 7 as shown in FIG. 3 and 4 which appears in the position D distant from the position A as focused by objective lens through phase grating 5 is prevented by phase grating 5' crossing phase grating 5.

FIG. 6 shows another embodiment of the optical low-pass filter in accordance with the present invention. The low-pass filter 9 includes a single base plate $9_1$ and striped pattern $9_2$ having two sets of laminae as a rectangular phase grating laminated on base plate $9_1$ in which the laminae of each set are arranged in parallel with each other and the laminae of the different sets are arranged at an angle to each other.

FIG. 7 shows the appearances of the diffraction images on focusing plane A and planes B, C, D, which are spaced certain distances from plane A of point image P on the optical axis through an optical system including objective lens system 6 and the optical low-pass filter 9 shown in FIG. 6, and diffraction striped patterns 10 generated on plane D in FIG. 7 which corresponds to plane D in FIG. 3 bring about no interference between them and the color-encoding filter 8 shown in FIG. 4 and FIG. 8.

Therefore, in a single tube color television camera and the like making use of an image forming optical system having a color-encoding filter 8 and provided with said optical low-pass filter, the generation of color striped patterns on the television picture which is effected by interference between object images which are focused on the plane to be focused and color-encoding filter 8 can be removed as a matter of course. Also, the generation of color striped patterns caused by diffraction striped patterns generated secondarily by object images which are focused on a plane spaced from the plane to be focused and the color-encoding filter 8 can be removed as well.

Figure 9:
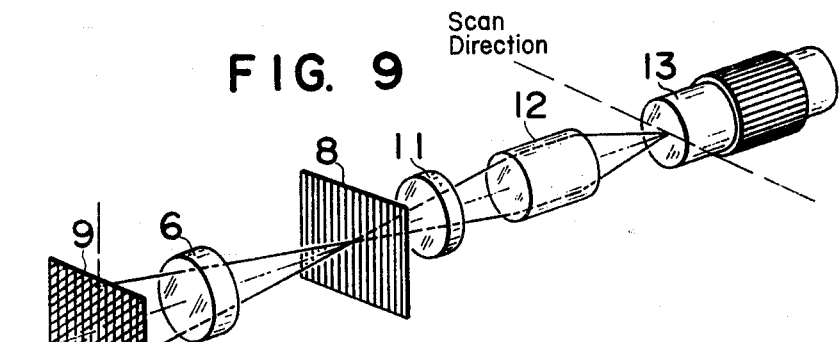
FIG. 9 is a perspective view showing the essential portions of an optical system for a single tube color television camera in accordance with the present invention.
Figure 11:
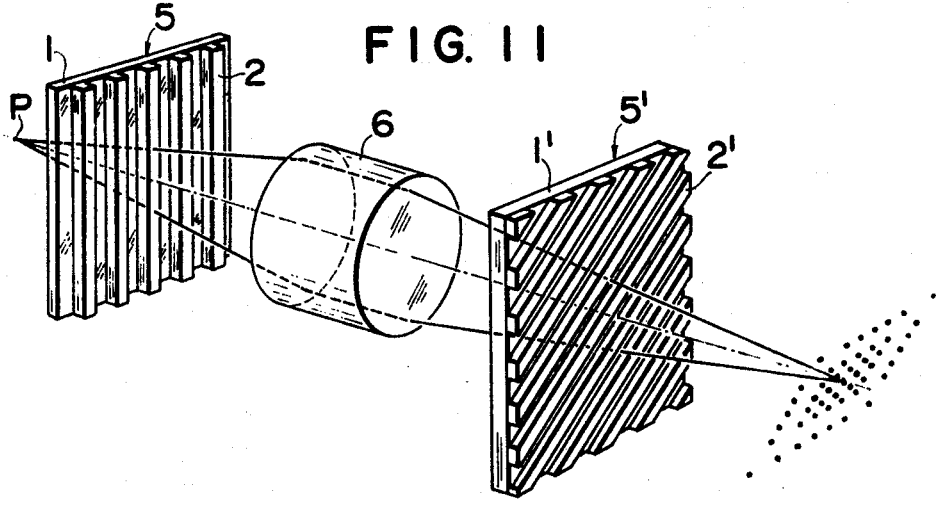
FIG. 11 is a perspective view of an optical system in another embodiment in accordance with the present invention.

FIG. 9 shows an example of the application of the optical system including an optical low-pass filter, in accordance with the present invention to an optical system for a single tube television camera wherein an object image is formed on a color-encoding filter 8, as shown in FIG. 8, by objective lens system 6 through optical low-pass filter 9, wherein said object image is separated into picture elements of three primary colors - blue, green and red -, and said separated picture image is formed on the plane of image tube 13 by field lens 11 and relay lens 12 whereby, by scanning this, the color signal of the picture image is obtained. In this case, the optical low-pass filter 9 is only required to be disposed both in the position of the pupil of objective lens system 6 and in the front or rear of said objective lens system 6. Also, it can be disposed as shown in FIG. 11.

Figure 10:
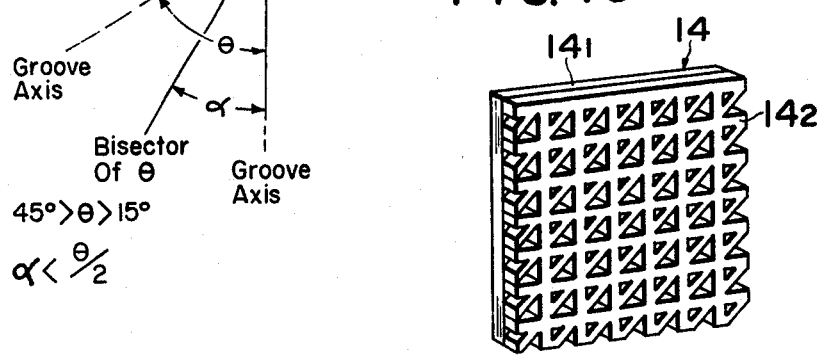
FIG. 10 is a perspective view of an optical low-pass filter of another embodiment in accordance with the present invention.

In the description of the embodiment and the applied example disclosed hereinbefore, the color-encoding filter employs three repetitive successive primary colored stripes in parallel with each other in one direction. As a result, the optical low-pass filter including two rectangular wave phase gratings 5 and 5' each having a set of laminae are arranged in parallel with each other on respective parallel base plates and the laminae on the different base plates are at an angle to each other as shown in FIG. 5. Alternatively, a phase striped pattern having two sets of laminae in each set of which the laminae are arranged in parallel with each other and laminae of different sets are arranged at an angle to each other, as shown in FIG. 6. Any beat effected by interference between a focused image or a defocused image on the color-encoding filter and color stripes of the color-encoding filter can be completely removed, however, it is necessary that the optical low-pass filter 14 including one base plate $14_1$ and a striped pattern $14_2$ having three sets of laminae for introducing phase retardation is laminated on base plate $14_1$ in which laminae in each set are parallel with each other and the laminae of different sets are oblique to one another as shown in FIG. 10 be employed, or the optical low-pass filter 5 formed with two rectangular wave phase gratings one of which having a set of laminae on the base plate as shown in FIG. 1 and the other of which having two sets of laminae on the base plate as shown in FIG. 6 are superimposed on each other so that the set of laminae of the former is arranged to be oblique to both sets of laminae of the latter.

Figure 12:
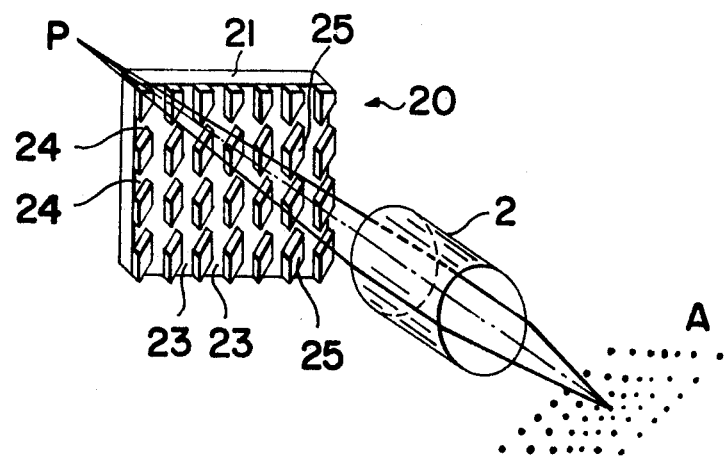
FIG. 12 is a perspective view of a system employing an optical low-pass filter in accordance with a further embodiment of the present invention, together with an objective lens and diagrammatically showing diffraction images on the focal plane.

FIG. 12 illustrates a further embodiment of the present invention in which the filter 20 therein consists of a transparent substrate 21 having superimposed thereon transparent lozenge or parallelogram diamond-shaped planar delay laminae 25 which are regularly arranged and are delineated by two angularly related sets of transversely spaced channels 23 and 24. Such a construction can be said in a sense to be the negative of that shown in FIG. 6. The fact that such a filter can achieve substantially the same function or operation as that shown in FIG. 6 is clearly derived from the description in lines 31 to 35 of column 3 in U.S. Pat. No. 3,756,695.

Figure 13:
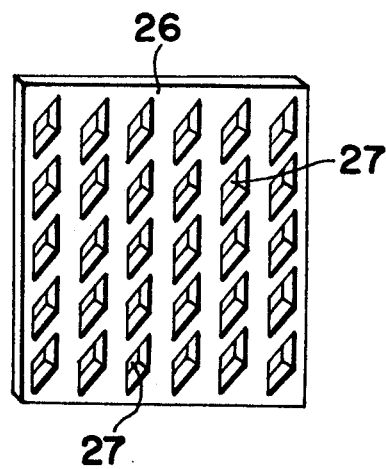
FIG. 13 is a perspective view of a mask plate used for manufacturing the optical low-pass filter shown in FIG. 12.

The filter 20 shown in FIG. 12 is formed by superimposing on the plane parallel transparent substrate 21 the mask plate 26 having lozenge-shaped openings shown in FIG. 13 and evaporating a material such as magnesium fluoride by vacuum evaporation for a predetermined time.

The use of the filter 20 shown in FIG. 12 is accompanied by many advantages. According to the experiment conducted by the inventors, the angle 0 at which channels of one set cross channels of the other set in the structure of FIG. 12 and as illustrated in FIG. 9 should preferably be selected between 15° and 45° for the purpose of eliminating beats in the color television image due to crosstalk between chrominance and luminace signals of the image formed through low-pass filter of one set of parallel laminae or channels, without worsening or decreasing the resolving power or resolution of the television optical system with respect to the direction perpendicular to the scanning direction of the optical system. If the angle is smaller than 15°, then the effect of eliminating beats for the defocused image decreases, while the dissolving power of the system with respect to the direction perpendicular to the scanning direction remains unchanged. If the angle exceeds 45°, then the resolution in the direction perpendicular to the scanning direction significantly decreases, while the beats can be eliminated perfectly. Hence, favorable range of the crossing angle is between 15° and 45°. The experiments further showed that the most suitable angle is about 30°. However, it is to be noted that the range of the crossing angle as mentioned above is not a critical limitation but merely a more advantageous measure. Therefore, one may manufacture, in accordance with the present invention, the low-pass filter with channels crossing at an angle beyond the range, if some beats or decrease in dissolving power are permissible.

In the experiments as mentioned above, low-pass filters of various angles between two sets of channels were one by one disposed in an optical system of a single tube color television camera so that the bisector of the acute angle between channels of different sets of the filter made a right angle with the scanning direction of the optical system, and television images produced by the television camera were observed from the view point of generation of beats and estimation of dissolving power. Then, the observation of television images were made changing the angle made by the bisector with the scanning direction. In the experiments, decrease in the resolution in the direction perpendicular to the scanning direction was not noticed so long as the bisector made a smaller angle with a direction perpendicular to the scanning direction than half the angle between channels of different sets, but the resolution remarkably decreases where the angle between the bisector and the direction perpendicular to the scanning direction is larger than half of the angle between two channels of different sets. Accordingly, it can be said that the low-pass filter should favorably be disposed in the optical system so that the angle $\theta$ between the bisector and the direction perpendicular to the scanning direction is not larger than half of the angle $\theta$ between two channels of different set.

Figure 15:
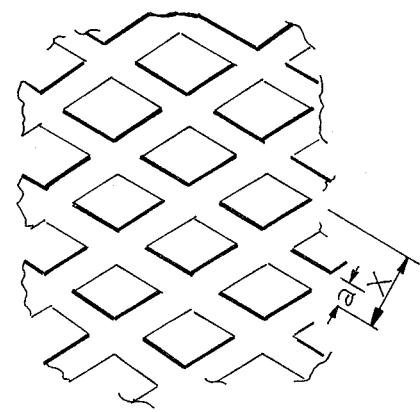
FIG. 15 shows the ratio of channel width to pitch.
Figure 14:
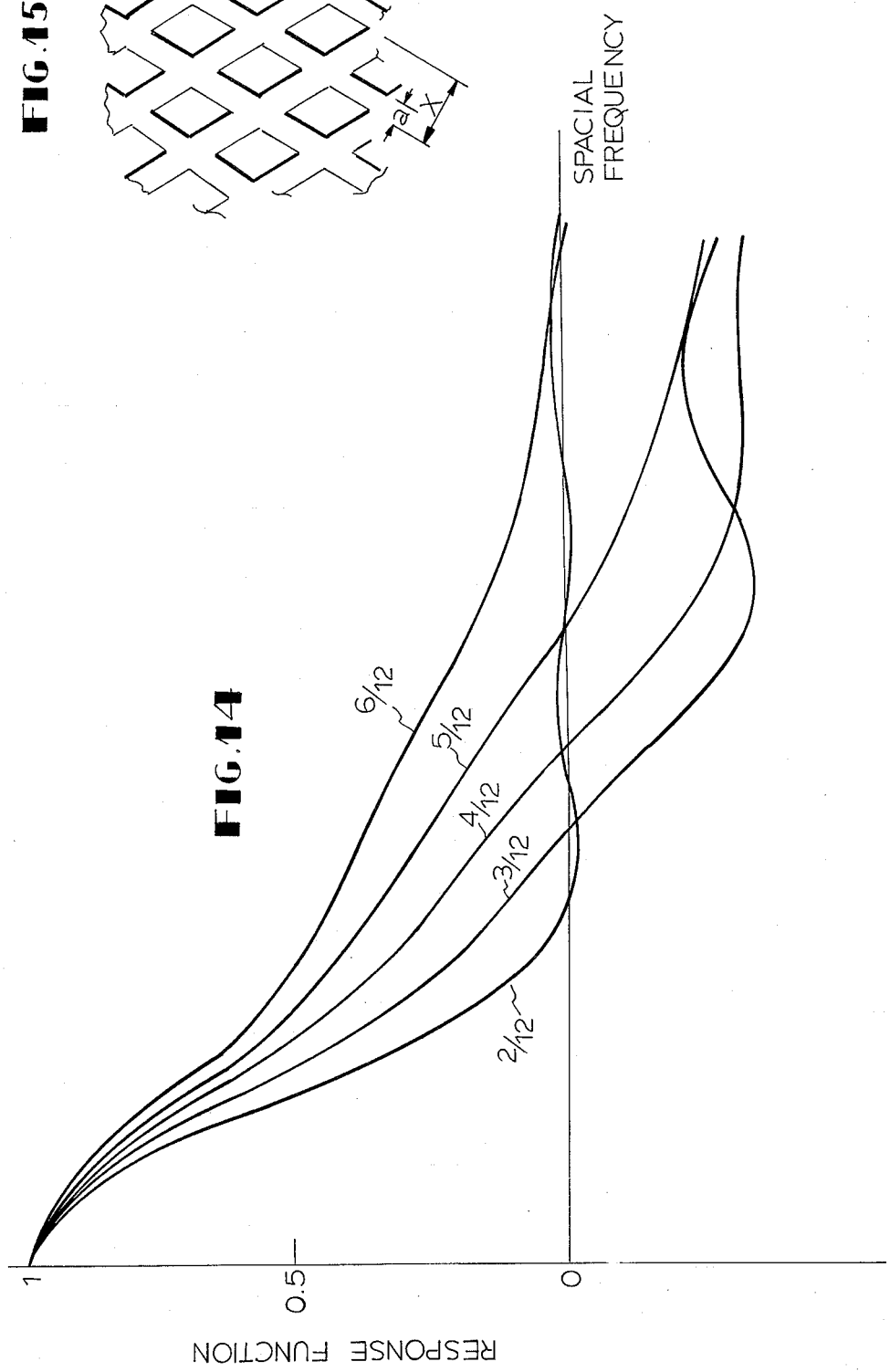
FIG. 14 illustrates the response function of the low-pass filter with respect to the scanning direction.

Further, analysis by computer for simulated various conditions of the low-pass filter, showed that response function characteristics varied with changes in ratio of width of each channel in each set to the pitch of channels in each set, as shown in FIG. 14, which ordinate shows the response function of the low-pass filter with respect to the scanning direction, and which abscissa shows spatial frequency at the image plane of the image detecting means. As seen in FIG. 15, in case the ratio of channel width a to the pitch X is between 1/6 to ½, the minimum value of the response function will be zero or minus, so that the spatial frequency for color signals can be selected at the band area where the response function of the low-pass filter is minimum and accordingly, there will occur no beat due to crosstalk between chrominance and luminance signals of the image formed through the low-pass filter. If the ratio exceeds that range, the minimum response function will be positive and the low-pass filter affect the chrominance signals to cause beats. Those results were confirmed by experiments. Accordingly, the ratio of channel width to pitch should favorably be between 1/6 and ½.

Thus, in the construction shown in FIG. 6, when the optical filter is fabricated, first, one set of stripes is formed on the substrate and then another set of stripes is formed, accordingly twice the labor is required and on portions where the laminae cross one another and are superimposed the phase or optimum delay effect desired cannot be obtained. However, in the construction shown in FIG. 12 two sets of stripes can be formed through only a single step and even at the crossed portions the optimum desired effect can be obtained.

In the case of FIG. 6, it may be possible to construct the low-pass filter so that the laminae are not superimposed at the point where they cross one another, i.e., so that the thickness of laminae of the low-pass filter is equal all over the outer plane, by forming second set of laminae between first set of striped laminae. For this purpose, evaporation may be utilized by making use of a mask plate having rectangularly shaped openings. However, this method also requires twice the labor and it is difficult to form the second set of laminae exactly between the first set of laminae in manufacture. So the filter shown in FIG. 2 is of most practical and effective structure.

Thus, by arranging one set of laminae for introducing phase retardation obliquely to the other set of laminae each time when sets of color striped patterns are at an angle to one another in the color-encoding filter are increased by one, interference between diffraction image patterns of Fraunhofer order and Fresnel order and the color-encoding filter can be eliminated.

Another method for forming the laminae on a transparent substrate is a photochemical method in which a layer of photoresistance material coated over one side of the substrate is exposed to light through a mask having a desired pattern of density variation so that only unexposed portions of the photoresistance material remain on the substrate. Then, transparent material such as MgF2 is coated over the side of substrate on which photoresistance material is disposed, and after that the photoresistance material is removed from the substrate together with the transparent material disposed thereon so that transparent material disposed directly on the substrate remains so as to form a desired pattern.

According to this method, one can construct the low-pass filter of FIG. 6 type but having laminae which are not superimposed at crossing portions, as easily as to yield a structure according to FIG. 12.

We claim:

1. A color television camera including an optical system of the type having a color-encoding filter means disposed in the light path of said optical system and serving to spatially modulate at least two color images with respect to a scanning direction and scanning means for detecting said image and producing chrominance and luminance signals, the optical system comprising optical low-pass filter means including a transparent substrate and at least two sets of channels formed on said substrate and delineating raised portions for introducing phase retardation, the channels in each set being arranged in parallel with each other and disposed at an angle of not less than 15° and not more than 45° to the channels of at least one other set, the angle between a line bisecting the acute angle formed between said sets of channels and the perpendicular to said scanning direction being no greater than half said acute angle.

2. An optical system as claimed in claim 1 wherein width of each channel is substantially equal to each other, and ratio of width of each channel in each set to the pitch of the channels in each set is between 1/6 and ½.

3. An optical system as claimed in claim 1 wherein said angle between channels of different sets is 30°.

4. An optical low-pass filter for use in a television camera optical system of the type having a color encoding filter means disposed in the light path of said optical system and serving to spatially modulate at least two color images with respect to the camera scanning direction, the low-pass filter comprising a transparent substrate and a plurality of laminae which are regularly arranged on a face of said substrate and are delineated by at least two sets of channels for introducing phase retardation, the channels in each set being arranged in parallel with each other and disposed at an angle of not less than 15° and not more than 45° to the channels of the other set and the angle between a line bisecting the acute angle between said sets of channels and the perpendicular to said scanning direction being no greater than half said acute angle.

5. An optical system as claimed in claim 4 wherein width of each channel is substantially equal to each other, and ratio of width of each channel in each set to the pitch of the channels in each set is between 1/6 and ½.

6. An optical system as claimed in claim 4 wherein said angle between channels of different sets is 30°.

7. An optical low-pass filter as in claim 4 wherein said substrate consists of a plane parallel plate of glass.

8. An optical low-pass filter as in claim 7 wherein said substrate comprises a lens and said laminae are mounted on a surface of said lens.

9. An optical low-pass filter as in claim 4 wherein said laminae are of diamond shaped cross-section and are delineated by two angularly related sets of traversely spaced channels.

10. The optical low-pass filter of claim 9 wherein each of said channels is linear and substantially continuous.

11. In a color television camera including an optical system of the type having a color-encoding filter means disposed in the light path of said optical system and serving to spatially modulate at least two color images with respect to a scanning direction and scanning means for detecting said images and producing chrominance and luminance signals, the optical system comprising an optical low-pass filter means including a transparent support and a plurality of optical elements disposed on said transparent support for introducing phase retardation in light transmitted through the filter;

said optical elements being composed of transparent laminae which are regularly arranged on said support and are delineated by at least two sets of channels, channels in each set being arranged in parallel with each other and disposed at an angle of not less than 15° and not more than 45° to the channles of the other set and the angle between a line bisecting the acute angle between said set of channels and the perpendicular to said scanning direction being no greater than half said acute angle, said laminae being so arranged that the section of one side of the filter taken along in at least one direction is the shape of rectangular wave in which the width of each projection and the space between adjoining projections are respectively equal to each other, and said laminae having the size in the direction perpendicular to the upper surface thereof to provide phase retardation selected from the range given by the following formula:

$$\cos \delta \leq 1 - 0.35 \, x \, (x-a)$$

$$, \cos \delta \geq 1 - 0.65 \, a \, (x-a)$$

wherein the character $x$ is the period of said rectangular wave, $a$ is the width of said laminae and $\delta$ is said phase retardation.

12. An optical system as claimed in claim 11 wherein width of each channel is substantially equal to each other, and ratio of width of each channel in each set to the pitch of the channels in each set is between 1/6 and ½.

13. An optical system as claimed in claim 11 wherein said angle between channels of different sets is 30°.

14. An optical system as in claim 11 wherein said support consists of a plane parallel plate of glass.

15. An optical system as in claim 11 wherein said support consists of a lens and said laminae are mounted on a surface of said lens.

16. An optical system as in claim 11 wherein said laminae are of diamond shaped cross-section and are delineated by two angularly related sets of traversely spaced channels.

17. The optical low-pass filter of claim 16 wherein each of said channels is linear and substantially continuous.

18. A color television camera including optical low-pass filter for use in an optical system of the type having a color-encoding filter means disposed in the light path of said optical system and serving to spatially modulate at least two color images with respect to a scanning direction and scanning means for detecting said images and producing chrominance and luminance signals, the optical system comprising phase diffraction filter means including a plurality of laminae which are delineated by at least two sets of channels for introducing phase retardation, channels of each set being arranged in parallel with each other and disposed at an angle of not less than 15° and not more than 45° to the channels of the other set, the angle between a line bisecting the acute angle between said sets of channels and the perpendicular to said scanning direction being no greater than half said acute angle, and channels in a set having the same size to provide phase retardations selected from the range given by the following formula:

$$, 1 - 0.35 \, (q + 1) \geq \cos \delta \geq 1 - 0.65 \, (q+1)$$

wherein $q$ is the ratio equal to the total sum of areas not covered by said laminae divided by the total sum of areas covered by the laminae, said ratio being not less than 1, and $\delta$ is the phase retardation.

19. An optical system as claimed in claim 18 wherein width of each channel is substantially equal to each other, and ratio of width of each channel in each set to the pitch of the channels in each set is between 1/6 and ½.

20. An optical system as claimed in claim 18 wherein said angle between channels of different sets is 30°.

* * * * *